United States Patent Office 2,820,260
Patented Jan. 21, 1958

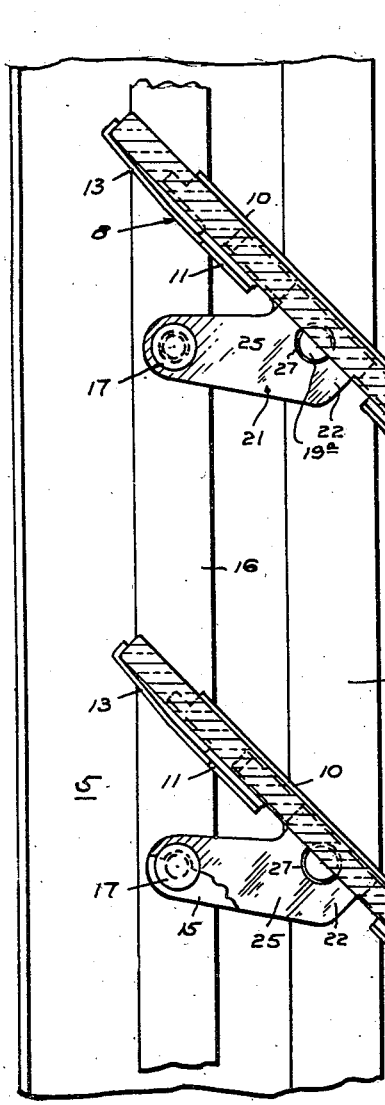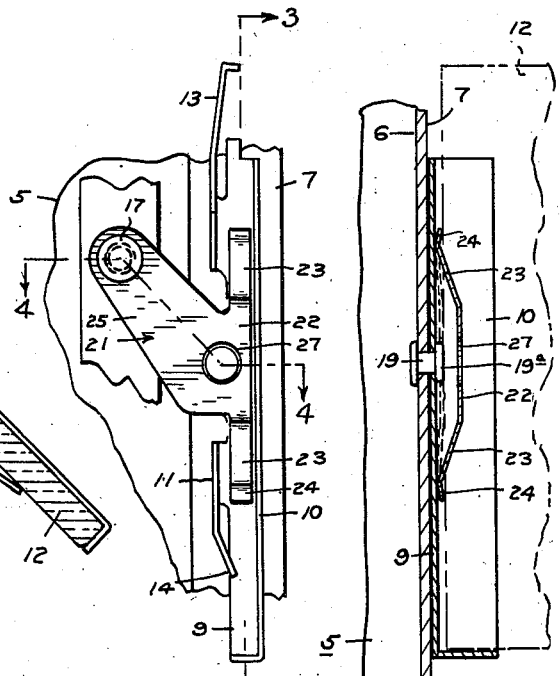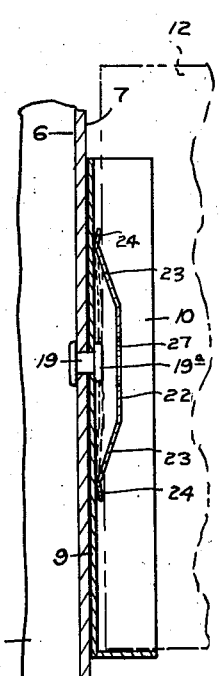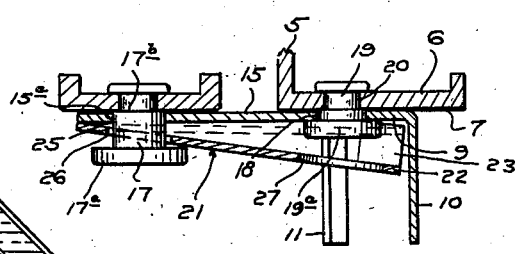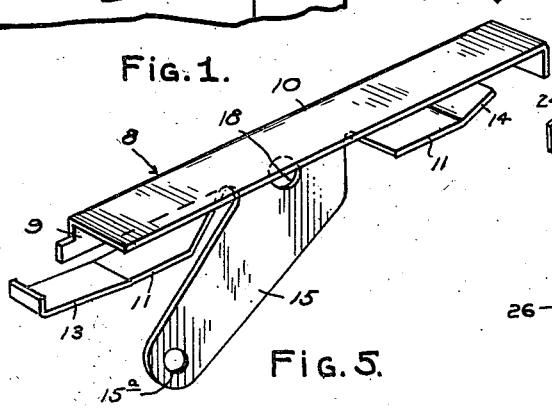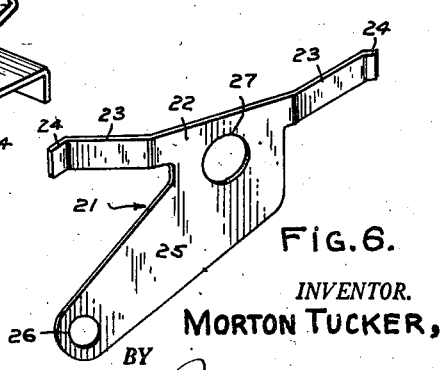

2,820,260

CLIP FOR JALOUSIE WINDOWS

Morton Tucker, Coral Gables, Fla.

Application November 18, 1954, Serial No. 469,673

2 Claims. (Cl. 20—62)

This invention relates to end clips for use in jalousie types of windows for the support of the opposite ends of conventional closure panels.

The invention has for its object a novel form of end clip having a crank arm and with the end clip being pivotally supported within the conventional extruded jalousie frames.

The invention contemplates novel flexible means that is disposed within the end clips in a manner to engage the end portions of the jalousie panels to prevent longitudinal movement of the panels within the clips and to retain the clips in snug engagement with the frame.

A further object of the invention resides in a novel form of spring device that is provided with oppositely extending arm portions that lie within a channel of the end clips and with the spring intermediate its ends shaped to conform to and substantially overlie the crank arms and with the spring device being apertured intermediate its ends to provide a clearance whereby the spring may be substantially fully depressed by the end of the panel to engage over the conventional pivot stud of the end clips.

It is well recognized in the jalousie construction that the jalousie panels are cut to substantially the correct length whereby their opposite ends will engage within the oppositely disposed clips as mounted within the frame, but it frequently happens that the panels are never accurately cut as to length, thus permitting end-play within the clips that tend to rattle and which fail to maintain the clips in snug engagement with the frame, and it is for this reason that the spring devices have been employed to effectively take up such end-play and simultaneously exert a pressure upon the end clips to maintain them in substantially weather-tight engagement with the frame.

A further object of the invention resides in a novel mounting for the spring whereby the spring may be effectively supported within the channel of the end clip free of any connection with said channel and the mounting of the spring permits the assembly of the clip and the spring without possibility of accidental displacement of the spring during shipment or during installation.

Novel features of construction and operation will be more clearly apparent during the couse of the following description, reference being had to the accompanying drawings, wherein has been illustrated a preferred form of the device and wherein like characters of reference are employed to denote like parts throughout the several figures.

In the drawings:

Figure 1 is a transverse section through a pair of adjacent jalousie panels that are supported within end clips mounted within a jamb member of a window frame, Figure 2 is a side view of one end clip with the panel removed, Figure 3 is a vertical section taken substantially on line 3—3 of Figure 2, Figure 4 is a slightly enlarged transverse section taken substantially on line 4—4 of Figure 2, Figure 5 is a perspective view of an end clip and, Figure 6 is a perspective view of a spring member associated with the clip.

Referring specifically to the drawings, the numeral 5 designates a jamb member embodied within a conventional extruded jalousie frame. The jamb member is provided with the usual forward flange 6 having a flat inner face 7 for the full height of the jamb. The face 7 constitutes the weathering face for cooperative engagement by the end clips embodied in the device.

Each end clip here indicated as a whole by the numeral 8 embodies a base 9 and a pair of opposed right angle flanges 10 and 11 that jointly constitute with the base 9 a channel, into which the end portions of glass panels 12 are inserted. The flange 11 has been cut away to form separate flange members having extended spring tongues 13 and 14 that yieldably engage a side of the panel, whereby the panel is held snugly against the flange 10. The base 9 substantially intermediate its length is provided with an outwardly extending and upwardly angled crank arm 15 that has pivotal connection with an operating bar 16 through the medium of a headed stud 17. The crank arm 15 is parallel to the base 9, and it is contemplated that the clip embodying the base 9, the flanges 10 and 11 and the crank arm 15, shall be made from a single section of sheet metal. The base 9 of the clip has been apertured at 18 for the reception of a headed stud 19 that passes through an opening 20 formed within the flange 6 and which constitutes the pivotal support for the clip.

It will be apparent that the several panels 12 will be shiftable on a horizontal axis through the medium of the stud 19 and under the influence of the operating bar 16.

Means are provided to exert an end pressure upon the opposite ends of the panels 12 whereby the panels will be supported against endwise movement and whereby the base of the clips is snugly held in weathering engagement with the face 7 of the flange 6. This means embodies a flat leaf spring indicated as a whole by the numeral 21 and includes an intermediate section 22 provided with oppositely extending and downwardly inclined flexible end portions 23, the terminal ends of which are slightly upturned, as at 24. The intermediate portion 22 is extended outwardly and upwardly and dimensioned to substantially overlie and be co-extensive with the crank arms 15, as shown at 25. The outer end of the extended portion 25 is apertured at 26 to overlie the stud 17 and with the diameter of the aperture 26 being such as to permit movement of the portion 25 toward and from the crank arm 15 under the influence of the spring arms 23. The intermediate portion 22 is further apertured at 27 and with the aperture 27 having a diameter capable of freely engaging over the head 19ᵃ of the pivot stud 19, whereby the spring device may be fully compressed within the channel of the clip to permit an engagement of the ends of the panels 12 to a point adjacent the heads 19ᵃ. It is contemplated that the device 21 shall be formed of spring metal. As clearly shown in Figure 4, the stud 17 is of sufficient length as to permit the relative freedom of movement of the extended portion 25 during the compression of the spring arms 23. The stud 17 thus serves as a means for pivotally supporting the crank arms 15 with respect to the operator bar 16 and likewise supports the spring member 21 in operative engagement with respect to the clip at all times to permit freedom of movement of the spring and to avoid accidental displacement thereof. While the extended portion 25 is freely engaged with the stud 17 beneath its head 17ᵃ, it will be apparent that the member 25 may be shortened and riveted to the crank arm adjacent the stud 17. However, it has been found desirable to shape the extension 25 so as to conform to and overlie the crank arm 15 to facilitate the assembly and to improve the ornamental appearance of the device. Thus, the spring is floatingly mounted with respect to the clip and offers no impediment to the normal engagement of the ends of the panels 12 within the channel of the clip.

In the assembly of the device, the clip 8 is pivotally supported in the usual manner upon the flange 6 through the medium of the stud 19. The spring member 21 is then disposed in a manner to position the spring arms 23 within the channel and with the aperture 26 being aligned with aperture 15ª of the crank 15. The stud 17 is then engaged through the apertures 26 and 15ª and, since the stud 17 is shouldered at 17ᵇ, the head 17ª will be positioned outwardly a distance capable of permitting the angular disposition of the extension 25 without compressive engagement of the spring arms 23. The panels 12 will then be engaged within their respective channels in the usual and well known manner compressing the spring arms 23 to avoid any end play in the panel. Since the conventional jalousie windows are shipped without the glass panels, it follows that the window, including the glass panels, it follows that the window, including the clips and the operator bar 16, may be fully assembled and shipped without danger of displacement of the spring devices 21. It will be apparent therefore that the spring devices 21 have no positive connection with the clips and float in a manner to be progressively compressed in accordance with the length of the respective panels, the members 25 rocking upon the studs 17.

It will be apparent from the foregoing that a new and novel spring device has been employed to effectively take up end play within the jalousie panels that permits the manufacture of the end clips in a simple and economical manner with the spring devices to be mounted as the clips are assembled with respect to the window. The spring devices are simple, economical to manufacture and easily installed at a minimum cost as compared with like devices and serve not only to prevent endwise movement of the panels but, due to the compressive action of the spring arms 23, serves to effectively force the clips against the face 7 in a weathering manner.

It is to be understood that the invention is not limited to the precise arrangement shown, but that changes are contemplated as readily fall within the spirit of the invention as determined by the scope of the subjoined claims.

Having described my invention, what I claim as new and desire to secure by Letters Patent is:

1. A panel retaining end clip for use in pivotally supporting closure panels within an open frame having side jambs provided with opposed faces, the clip embodying a base member and opposite and opposed side flanges at right angle to the base for forming an open channel for the reception of one end portion of the panel, a headed stud pivotally supporting the base member upon a jamb face, the base member at one side being extended to provide an angularly disposed flat crank arm that is apertured adjacent its free end for pivotal connection with an operating bar whereby the clip may be shifted upon its headed stud, a spring device that is formed flat throughout its major area, the spring device over its major area being shaped to be co-extensive with and to overlie the crank arm, the spring device being apertured at one end to underlie the pivotal means of the crank arm loosely whereby the spring device is substantially floating toward and from the crank arm, the spring device being extended to terminate within the open channel and in the path of movement of the end of a panel, and with the extended portion provided with oppositely extending spring arms that overlie the base member, the extended portion of the spring device provided with a relatively large aperture that engages over the headed stud when the spring is depressed by engagement with the end of the panel.

2. The device according to claim 1, wherein the oppositely extending spring arms are angled downwardly to normally contact the surface of the base member.

References Cited in the file of this patent

UNITED STATES PATENTS 2,640,233    Silvers                   June 2, 1953